United States Patent

Voigt et al.

[11] Patent Number: 5,907,433
[45] Date of Patent: May 25, 1999

[54] COMPACT VARIABLE FIELD OF VIEW OPTICAL SYSTEM

[75] Inventors: Allan A. Voigt; John M. Speicher; Che-Ram S. Voigt, all of Geyserville, Calif.

[73] Assignee: Versatron Corporation, Healdsburg, Calif.

[21] Appl. No.: 08/874,432

[22] Filed: Jun. 16, 1997

[51] Int. Cl.⁶ .......................... G02B 13/06; G02B 23/00
[52] U.S. Cl. .......................... 359/432; 359/399; 359/857
[58] Field of Search ................... 359/350–351, 359/353–354, 364–366, 399–400, 407, 419–422, 432, 672, 726–732, 850–871

[56] References Cited

U.S. PATENT DOCUMENTS

| | | | |
|---|---|---|---|
| 3,825,315 | 7/1974 | Altman et al. | 250/349 |
| 3,947,084 | 3/1976 | Noyes | 359/354 |
| 4,486,069 | 12/1984 | Neil et al. | 359/354 |
| 4,877,317 | 10/1989 | Gibbons et al. | 359/421 |
| 4,989,962 | 2/1991 | Kebo | 359/354 |
| 5,024,493 | 6/1991 | Fantozzi et al. | 359/356 |
| 5,089,910 | 2/1992 | Sigler | 359/399 |
| 5,151,820 | 9/1992 | Sillitto et al. | 359/354 |
| 5,229,880 | 7/1993 | Spencer et al. | 359/353 |
| 5,363,235 | 11/1994 | Kiunke et al. | 359/365 |
| 5,548,439 | 8/1996 | Smith | 359/421 |
| 5,548,442 | 8/1996 | Devenyi et al. | 359/432 |

*Primary Examiner*—Thong Nguyen
*Attorney, Agent, or Firm*—Henry M. Bissell

[57] ABSTRACT

An optical system is provided with a plurality of field of view optical groups for insertion into the optical path. The field of view optical groups each subtend a prescribed field of view angle and are rotatably mounted on a rotary assembly for insertion into an operational position in the optical path. The rotary assembly is provided with hard stop contacts which rotate along a path and interact with stationary stops to locate the optical groups in the operational position. Additionally, movable stops are reciprocated into the rotation path of the hard stop contacts to provide additional modes, including a calibration mode. The system is also provided with extender optical groups which can be inserted in the optical path to provide intermediate fields of view between those of the field of view optical groups, thereby doubling the total number of fields of view available. The intermediate fields of view ease the transitions between fields of view achieved by the field of view optical groups and provide an effective step zoom mode of operation with increased overall zoom ratio.

37 Claims, 6 Drawing Sheets

COMPACT VARIABLE FIELD OF VIEW OPTICAL SYSTEM

BACKGROUND OF THE INVENTION

1. Field of the Invention

The invention relates to cameras and other optical devices in which variable fields of view are desired and are implemented in a compact and relatively inexpensive design.

2. Description of the Related Art

Optical devices having systems for varying the field of view are known in the art. Such devices are useful in, for example, infrared imaging and navigation systems where a very wide field of view might be required for one operation and a more limited, detailed field of view required for another.

Various methods are commonly deployed by conventional field of view varying systems. In U.S. Pat. No. 3,825,315 to Altman et al., a lens arrangement for infrared telescopes is provided with movable lenses which translate along the optical path of the system to continuously change system magnification and field of view.

In U.S. Pat. No. 3,947,084 to Noyes, a cam mechanism simultaneously translates one lens group linearly and another lens group nonlinearly along the system optical axis to achieve variable magnification and field of view. The system is designed for operation in the infrared wavelength range.

In U.S. Pat. No. 5,089,910 to Sigler, the lens elements of a catadioptric system are mounted for translation along the optical axis. The translation is also effected by a cam mechanism which imparts linear and nonlinear movement to the various elements involved.

In U.S. Pat. No. 5,151,820 to Sillitto et al., a pair of refractory elements are switched between two conjugate positions on the system optical axis to provide two distinct fields of view. The refractory elements, comprised of lenses, are mounted on a carriage which translates linearly along a track. A motor is provided for imparting motion to the carriage.

U.S. Pat. No. 5,229,880 to Spencer at al. shows a system in which one of two sets of optical elements is inserted into the optical axis to enhance the field of view of the system. Insertion of one set of optical elements provides an intermediate field of view, while insertion of the second set provides a wide field of view. The absence of either set from the optical axis retains the system narrow field of view.

U.S. Pat. No. 5,363,235 to Kiunke et al. shows a reflecting telescope arrangement which uses one set of optical elements to widen the field of view. When this set is disposed in the optical axis, the system achieves a wide field of view, while when the set of optical elements is retracted, a narrow field of view is attained. Motion of the optical elements is affected manually or electro-mechanically.

U.S. Pat. No. 5,024,493 to Fantozzi at al. shows a compact arrangement in which a specific combination of lenses and mirrors is used. The patent enables attainment of a long focal length in a relatively confined space, such as the turret of an aircraft. No provision is shown for varying the field of view of the device.

SUMMARY OF THE INVENTION

A major shortcoming of the prior art is that the features of variable field of view and compactness have not been satisfactorily combined. Known arrangements that are used to vary the field of view suffer from lack of compactness, taking up excessive space in applications such as aircraft navigation and weapons guidance where space is at a premium. Moreover, the prior art has relied on complex mechanisms presenting cost and alignment problems to effect the variable field of view systems.

This invention solves the deficiencies of the prior art and provides a simple, compact multi-field of view system for use with infrared or other cameras. More particularly, the invention achieves a compact, especially short lens arrangement that allows packaging in small spaces such as in an airborne gimbal system. A large collecting area, low f-number system (i.e., an optically fast system) is provided while maintaining short axial length. Furthermore, this invention provides incremental changeable fields of view ranging from wide fields, such as can be used for aircraft pilotage, to very narrow fields of view that are used for observing details from very long distances. Within these incremental fields of view, a preferred arrangement of this invention provides a series of steps that allows a constant or near constant proportion of field of view change step by step through six fields of view from the widest to the narrowest or conversely from the narrowest to the widest. This arrangement allows what can be called a "quasi zoom" or step zoom mode wherein image size changes incrementally at this fixed ratio but where the fixed ratio is small, approximately a factor of two or three, and the perception of the viewer is that the viewing vantage point is being moved closer and closer to the object of interest.

Operation in this "quasi zoom" or step zoom mode achieves the functional equivalent of a very heavy, complex and expensive zoom lens in a light and compact arrangement. It can also achieve a very large optical ratio between the widest field and the narrowest field, for example, a 40° wide field of view and a 0.4° narrow field of view. This ratio of 40 to 0.4 or 100:1 exceeds the capability of virtually all existing conventional zoom lenses. An example of the step size required to obtain this 100:1 ratio with six fields of view, which is five field of view changes or steps, is attained by calculating the fifth root of 100 which is approximately 2.51. This ratio change of 2.51 would be incorporated in the lens system so that each time the elements were switched the field of view would change by that ratio. As a result the overall ratio obtained by field of view changes would be about 100:1. It is interesting and important to note that the ratio from one field in the sequence to the next field only needs to vary from 2/1 to 2.5/1 to change the system option ratio from 32:1 (i.e., $(2)^5$) to nearly 100:1 (i.e., $(2.51)^5$). This means that, practically, any required optical ratio is achievable with incremental steps between adjacent fields of view of less than three with a six field of view arrangement.

Many existing systems have three fields of view. These, however, are limited in overall optical ratio because the step between adjacent fields of view becomes so large that objects of interest are often lost from view during the switching operation. By using the incremental quasi zoom arrangement of the present invention, this limitation is overcome. Moreover, a greater range between the narrowest and widest field of view is achieved because the quasi zoom approach of the invention provides intermediate fields of view which incrementally bridge successive field of view changes.

The optical configuration of the invention can be thought of as a three field of view telescope in which the wide and medium fields of view are provided by coaxial refractive elements and the narrow field is provided by a Cassegrain reflective primary and secondary mirror set. Behind this three field of view telescope is a switchable optical extender mechanism which can be switched in to provide further optical power. By adjusting the optical design such that the optical power of the extender is approximately one-half of the optical power of any of the steps between the wide and the medium and between the medium and the narrow fields of view, a telescope which provides five equal optical steps is achieved.

For example, for a 2× extender, the front lens and mirror ratio would be designed to be twice the extender ratio or 2×2=4. Therefore, if the wide field of view was 32° with the extender out, it would be 16° with the extender in. The medium field of view would be designed for ¼ of 32°=8°. Hence a ratio of 2:1, which would achieve 32:1 overall ratio between the widest and narrowest fields of view in a five-step system, would require that the wide field of view optics subtend an angle that is 16 times the width of the angle subtended by the narrow field of view optics and 4 times the width of the angle subtended by the medium field of view optics. Similarly, a ratio of 2.51:1, which would achieve a 100:1 overall ratio between the widest and narrowest fields of view in a five-step system, would require that the wide field of view optics subtend an angle that is in the range of 40 times the angle subtended by the narrow field of view optics and in the range of 6 times the angle subtended by the medium field of view optics. The following Table I shows two examples of this approach with the resulting overall optical fields of view indicated.

TABLE I

| Field of View | Front Lens State | Extender State | Resulting Field Of View 32:1 (2:1) | 100:1 (2.51:1) |
|---|---|---|---|---|
| 1 | Wide | Out | 32° | 100° |
| 2 | Wide | In | 16° | 39.8° |
| 3 | Medium | Out | 8° | 15.8° |
| 4 | Medium | In | 4° | 6.3° |
| 5 | Narrow | Out | 2° | 2.5° |
| 6 | Narrow | In | 1° | 1° |

The invention presents numerous advantages over the prior art, some of which are the following:

Fast Switching Times

The invention allows fast switching between fields of view which is essential for operation without excessive blanking times. The electromechanical design of the field of view control allows changes to be made in fractions of a second. These rapid changes fall within acceptable parameters since the image changing time is very short.

Contributing to the fast switching are separate actuation mechanisms of the front lens and mirror rotary assembly and the extender assembly, which also permit non-sequential switching between fields of view. For examples direct switching from the widest field of view position to the narrowest field of view position can be effected without having to pass through the four intermediate fields of view by selecting the appropriate rotational direction of the front lens and mirror rotary assembly and the appropriate extender assembly position. The lens control computer can precisely time events from its internal digital clock, thereby allowing the changes to be made in minimum time.

Mass Balancing of Moving Parts

An important feature of this system is that all moving parts are mass balanced such that the center of gravity of the lens system does not change when fields of view are switched. This is important when the device is applied to optical, inertially stabilized systems because mass imbalances induce motion in the optical line of sight.

Parking Position Of Secondary Mirror And Lens Barrels

It is a feature of this design that the parking position for the secondary mirror and lens barrels is compatible with closely packed adjacent optical payloads. When the Cassegrain telescope is operational, i.e. in the narrow field of views the medium and wide lens sets are parked out of the lens aperture.

Optimized Energy Detection

The field of view changer rotates around an axis which is supported by bearings. The bearings are supported by a "C" shaped bracket which reaches over the primary mirror. The "C" shaped bracket also supports the motor and drive mechanism for rotating the front lens and mirror rotary assembly. The bracket also provides support for the focusing (also referred to as the focus group assembly or the focus lens group), focusing motor (also referred to as the focus drive or the reduction drive motor) and focus feedback potentiometer (also referred to as the feedback potentiometer or focus position feedback device).

This arrangement of the "C" shaped bracket reduces obscuration of the primary mirror since, when the telescope is operational, the supporting mechanisms for the secondary mirror are hidden in the shadow of that bracket. This is an advantage because more of the scene energy is transmitted to the detector.

Interchangeable Lens Barrels

The invention utilizes interchangeable lens barrels which allow prescription changes without changing the basic mechanism. This is a major advantage since the mechanical system is virtually unchanged while the optical prescription is modified. Therefore, special lens arrangements for particular requirements can be configured with relatively small costs and short schedule.

Moderate Cost

It is an objective of this lens design to reduce costs of comparable systems by reducing the size and weight of expensive optical components such as germanium lenses for infrared systems. The large elements are diamond turned aluminum components which are readily fabricated at reasonable cost either as spheric or aspheric surfaces.

Intermediate Fields of View

The extender assembly works in conjunction with the optical telescope to allow intermediate fields of view in any of the telescope positions. This extender has an optical ratio in the region, usually, of 2 to 2.5. The extender ratio can be adjusted to one-half of the optical step ratio between the three fields of view of the system to attain six fields of view which are separated by a constant ratio between approximately 2 and 2.5.

Extender Optical System Stop Mechanism

Incorporated as part of this optical arrangement is an optical system stop mechanism which is necessary for infrared systems. This stop arrangement allows the optical shielding efficiency to remain high even though the system f-number changes when the extender is changed.

Rear Extender Filters

System optical filters can be incorporated as part of the extender assembly such that the system optical band pass can be modified by selecting the extender position. Although two extender positions are incorporated in the present implementation, as an option three or four or more could be obtained by various arrangements of mechanical stops operating in conjunction with the extender assembly.

Simplified System Control

The system can most easily be controlled by a computer which tracks the position states of the optical elements. The fields of view are controlled by the three moving mechanisms, i.e., the front lens and mirror rotary assembly, the bi-stable stop insertion motor and the extender assembly. The computer keeps track of these mechanisms, which do not need to have feedback devices to indicate their states since they will remain in the previously set state until commanded by the controlling computer. The control computer simply keeps track of their existing state in order to impart the correct sequence of commands when a new state is desired.

Versatility Of Functions

The lens control computer coordinates the movement of the front lens and mirror rotary assembly and extender assembly to achieve a desired field of view. Command inputs to the computer from the operator determine the field of view state desired. The logic in the control computer compares the desired state to the existing state and commands a sequence of events or state changes which will result in the system acquiring the desired state. In some cases, this can be a sequence of events or state changes which allow the various components to operate in conjunction with other elements in the overall system to effect different functions such as calibration of a staring array infrared camera.

Speed Of Calibration Position Changing

The speed with which the state changes can be accomplished is important because in some cases, such as calibration, a series of five or ten state changes needs to be made to complete the calibration process. The control computer is ideally suited for this task.

Accurate Positioning

Multiple, accurate, repeatable positions for the field of view optical groups are achieved by the invention as required for satisfactory optical performance. This is provided by a plurality of hard stops, some of which are fixed while at least two hard stops are moveable. The hard stops allow selecting three fields of view and a calibration position in the front lens and mirror rotary assembly. The moveable stops are selected by the bi-stable stop insertion motor as discussed below.

The hard stops are designed to allow rapid motion of the front lens and mirror rotary assembly without the impact damaging the precision hard stop. A special arrangement allows the impact of rotating parts to be attenuated by a spring mechanism which keeps the peak forces low enough to avoid damaging the hard stops. This arrangement provides precision repeatability and precision adjustment of the stop using a stop adjustment screw.

Each stop is configured with a magnetic detent to maintain the front lens and mirror rotary assembly in contact with the hard stop when the drive motor is turned off. This assures that each state will be maintained until commanded to a different state. It also eliminates the requirement for power to maintain a lens position or state. The magnetic detents are strong enough to maintain the lens position under normal operating conditions. When the motor is powered the magnetic detent is overcome by the motor torque and the lens assembly rotates until it hits the next hard stop.

Multiple Positions For Extender Stops

The extender can be configured with two fixed hard stops. As an alternative, the extender can utilize a moveable stop or a plurality of moveable stops in addition to the fixed stops. The operation of the moveable stops can be similar to that used on the front lens and mirror rotary assembly. As an alternative, a mechanically resettable latch can be used. The moveable stop configuration can be used where other optical extender ratios or system filters are needed to meet certain operating conditions.

Bi-Stable Stop Insertion Motor

A unique feature of the lens design is the bi-stable stop insertion motor which allows four individual accurate positions of the front lens and mirror rotary assembly. This motor is magnetically detented and bi-stable. Hence, once powered to one of its two positions, it will hold that position until re-powered to the other position.

Calibration Position Mechanism

Incorporated on the rotational part of the bi-stable stop insertion motor are the positioning stops for the wide field of view as well as for the calibration mode. To attain the wide field of view configuration, the front lens and mirror rotary assembly are commanded to the medium field of view position while the bi-stable stop insertion motor is in the disengaged position. Then the bi-stable stop insertion motor is commanded to the engaged position and the front lens and mirror rotary assembly is commanded to rotate counter-clockwise as if trying to position the secondary mirror in its operational position. The hard stop contacts the stop on the bi-stable stop insertion motor and the lens assembly is thus configured in the wide field of view position.

To effect the calibration mode the front lens and mirror rotary assembly is commanded to the operating position of the Cassegrain telescope in the narrow field of view. From this state the bi-stable stop insertion motor is engaged and the front lens and mirror rotary assembly rotated clockwise as if to engage the medium field of view but the rotation is limited by the stop on the bi-stable stop insertion motor, fixing the system in the calibration mode.

Focusing Mechanism

The focusing mechanism is specially designed to work with the "C" shaped rotary assembly support bracket. This mechanism stays in the shadow of the "C" shaped support bracket and therefore produces no additional obscuration. The focusing mechanism is unique and is comprised of a reduction drive motor which rotates the long drive shaft passing through the "C" shaped bracket base in a direction radial to the optical axis. This drive shaft has an eccentric spherical headed pin on the end adjacent to the focusing lens assembly. This pin engages one of a series of holes drilled in the outer diameter of the focusing lens assembly barrel. The rotation of the focusing shaft causes the focusing barrel to move in and out which changes the system focus. A multiplicity of holes is provided in the outer diameter of the focusing lens assembly. Each of these holes is slightly different in axial position and therefore, by selecting the desired hole, the system focus range can be selected. This spherical headed pin controls the rotational position of the focusing lens assembly as well as its axial position. An advantage of this focusing arrangement is that no hard stops are required since the focusing shaft can be continuously rotated without contacting a hard stop. If the focusing shaft is continuously rotated the focusing barrel will simply move in and out over the full focus range cyclically.

Feedback For Positioning Focus

A feedback potentiometer is provided to monitor the position of the focusing shaft in order that the lens focus position can be obtained by the control computer. The control computer can therefore refocus the lens during the field of view changes.

DESCRIPTION OF THE DRAWINGS

A better understanding of the present invention may be realized from a consideration of the following detailed description, taken in conjunction with the accompanying drawings, in which.

DETAILED DESCRIPTION OF THE PREFERRED EMBODIMENTS

Figure 1A:
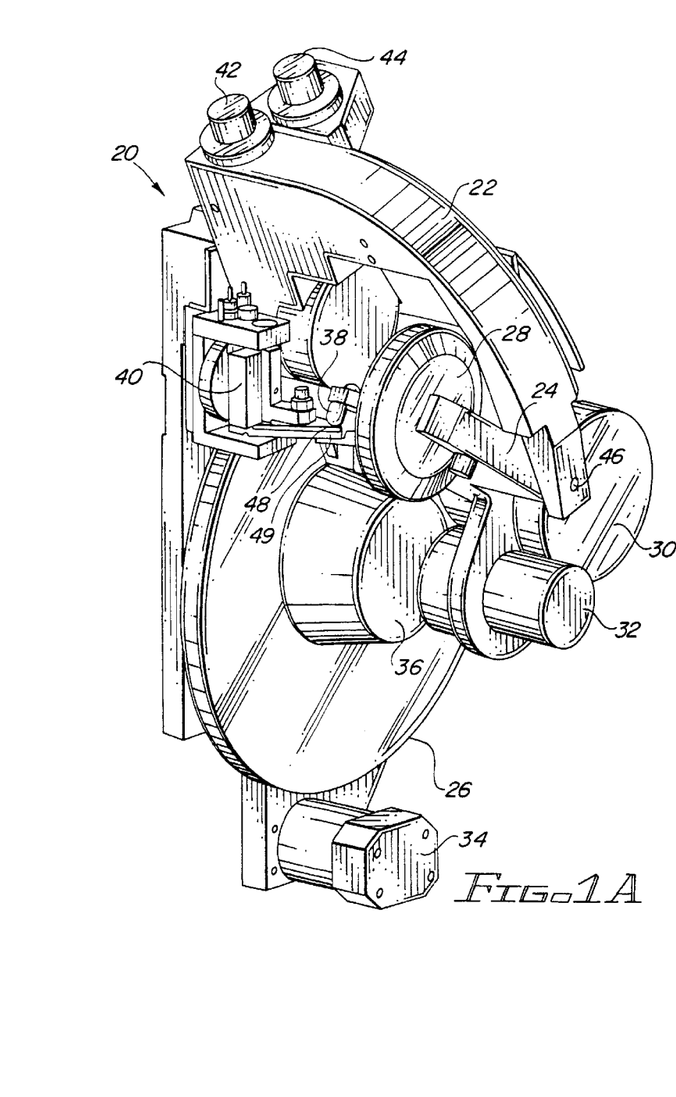
FIG. 1A is a perspective view of the preferred embodiment of the invention in the wide field of view position.
Figure 1B:
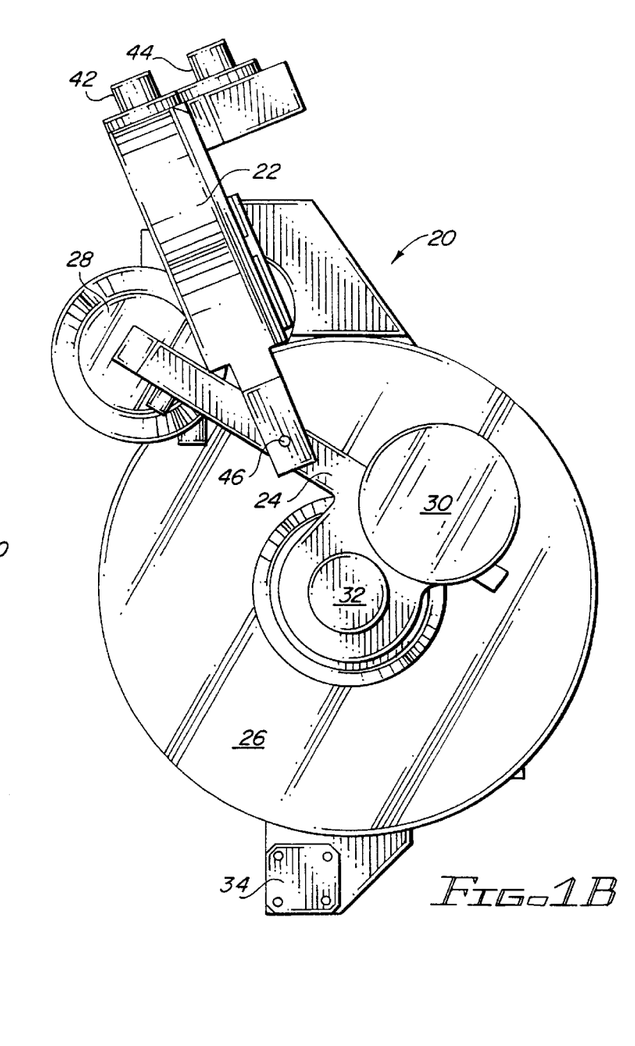
FIG. 1B is a head-on view of the arrangement of FIG. 1A.

FIGS. 1A and 1B show the general lens arrangement and the mechanism for changing fields of view. The variable field of view system 20 of the invention includes a front lens and mirror rotary assembly 24 to which are mounted medium field of view optical group 30, wide field of view optical group 32, and narrow field of view secondary mirror 28 which operates in conjunction with primary mirror 26 in a Cassegrain telescope arrangement. A Cassegrain telescope, also referred to as a Cassegrain objective, describes a reflecting telescope in which a small hyperboloidal mirror reflects the conversion beam from the paraboloidal primary mirror through a hole in the primary mirror to an eyepiece in back of the primary mirror. McGraw-Hill Dictionary of Scientific and Technical Terms, p. 231, McGraw-Hill, Inc. 1974. The optical axis of such an arrangement is a line passing through a radially symmetrical optical system such that rotation of the system about this line does not alter it in any detectable way. IBID, p. 1043. Such terms are well known to those skilled in the art. The rotary assembly 24 is mounted to allow rotation on an axis 46. This axis is supported by a roughly "C" shaped support member 22 which reaches over primary mirror 26. Focusing mechanism 36 is adapted to generally occupy the shadow of "C" shaped support member 22. Reduction drive motor 42 controls system focus. Focus position feedback potentiometer 44 provides monitoring of focus position for a computer.

Rotary assembly 24 is driven by a small electric motor (not shown) which can be commanded to rotate either clockwise or counterclockwise by a voltage signal applied from an electronic driver which is controlled via computer input. The motor continues driving until rotary assembly 24 contacts one of a plurality of hard stops which serve to limit its rotation. Two of these hard stops, movable stops 48 and 49, are mounted for movement in and out of the rotation path of rotary assembly 24. Moveable stops 48 and 49 are driven by bi-stable motor 40, which is also controlled by voltage from an electronic driver which is controlled via a computer and its operation is coordinated with the motion of the clockwise and counterclockwise motion of the rotary assembly 24. The arresting action of stop 48, depicted in FIGS. 1A and 1B, occurs when rotary assembly 24 is commanded to rotate counterclockwise from the medium field of view starting point of FIGS. 2A and 2B. This arresting action results in fixing the position of the rotary assembly 24 such that the wide field of view optical group 32 is in operational position in the optical axis.

Figure 2A:
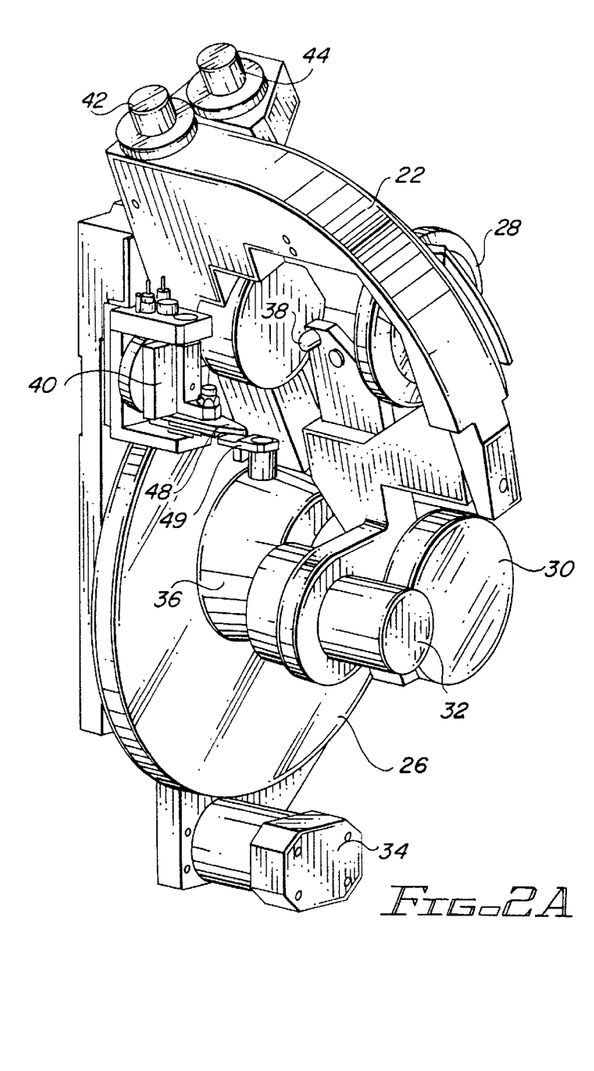
FIG. 2A is a perspective view of the preferred embodiment of the invention in the medium field of view position.
Figure 2B:
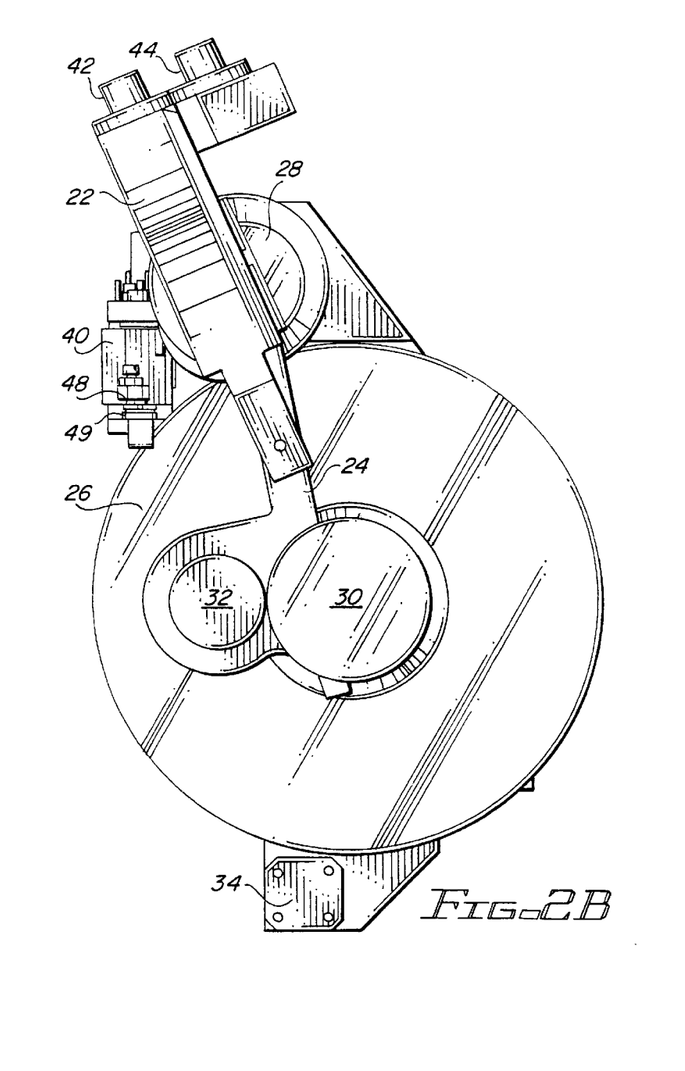
FIG. 2B is a head-on view of the arrangement of FIG. 2A.

To arrive at the wide field of view position (seen in FIGS. 1A and 1B), the system is first commanded to the medium field of view position of FIGS. 2A and 2B, which is used as the starting point. The bi-stable motor 40 is then commanded to the engaged position, causing insertion of movable stops 48 and 49 into the rotational path of rotary assembly 24. Rotary assembly 24 is subsequently rotated counter clockwise until arrested by the interfering movable stops, thereby locating the wide field of view optical group 32 in the optical axis.

Figure 4A:
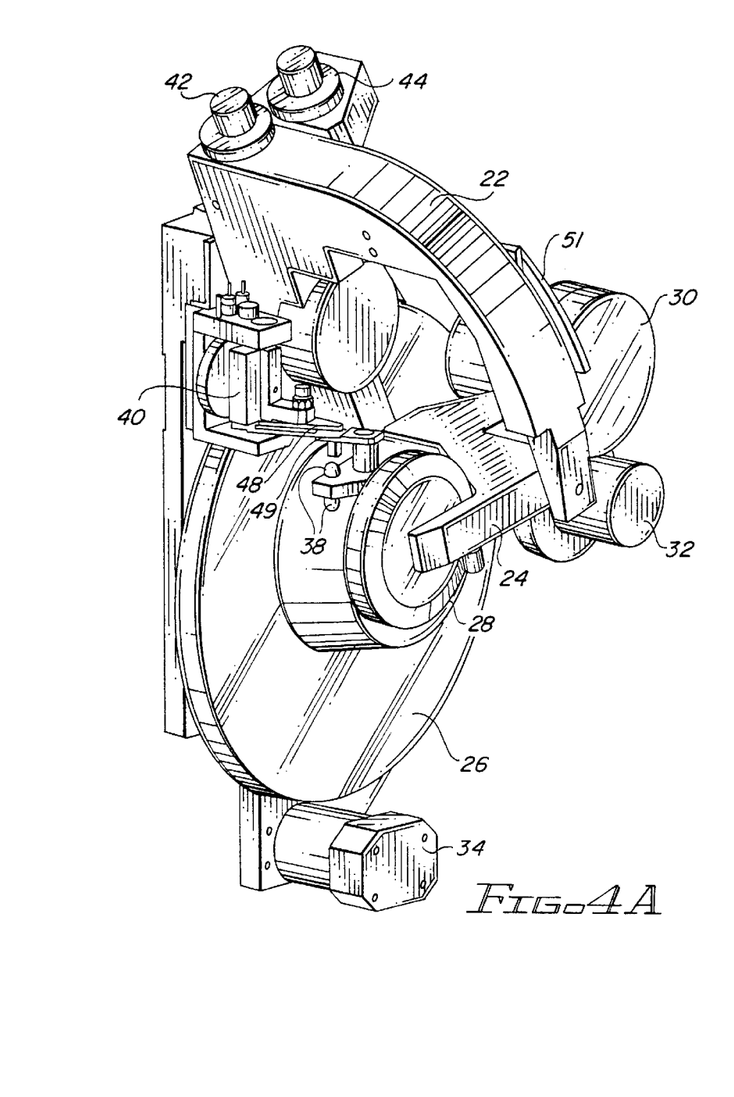
FIG. 4A is a perspective view of the preferred embodiment of the invention in the calibration position.
Figure 4B:
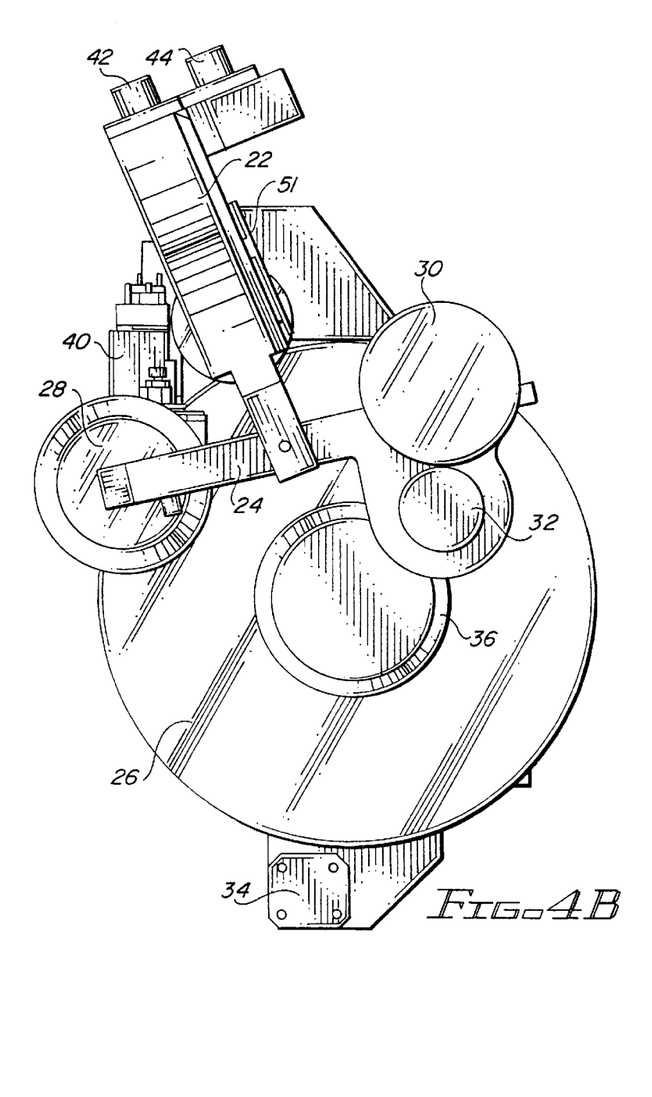
FIG. 4B is a head-on view of the arrangement of FIG. 4A.

Depending on the position and rotation direction of rotary assembly 24 when the bi-stable stop motor 40 is commanded to insert stops 48 and 49, the operational position for the wide field of view optical group 32 or, as shown in FIGS. 4A and 4B, the system calibration position is achieved. Thus when operating to arrest counterclockwise rotation, per FIGS. 1A and 1B, movable stop 48 serves to fix the position of wide field of view optical group 32 in the optical axis; while when operating to arrest clockwise rotation of rotary assembly 24, movable stop 49 clears all the optical groups from the optical axis to achieve a calibration position shown in FIGS. 4A and 4B.

Figure 3A:
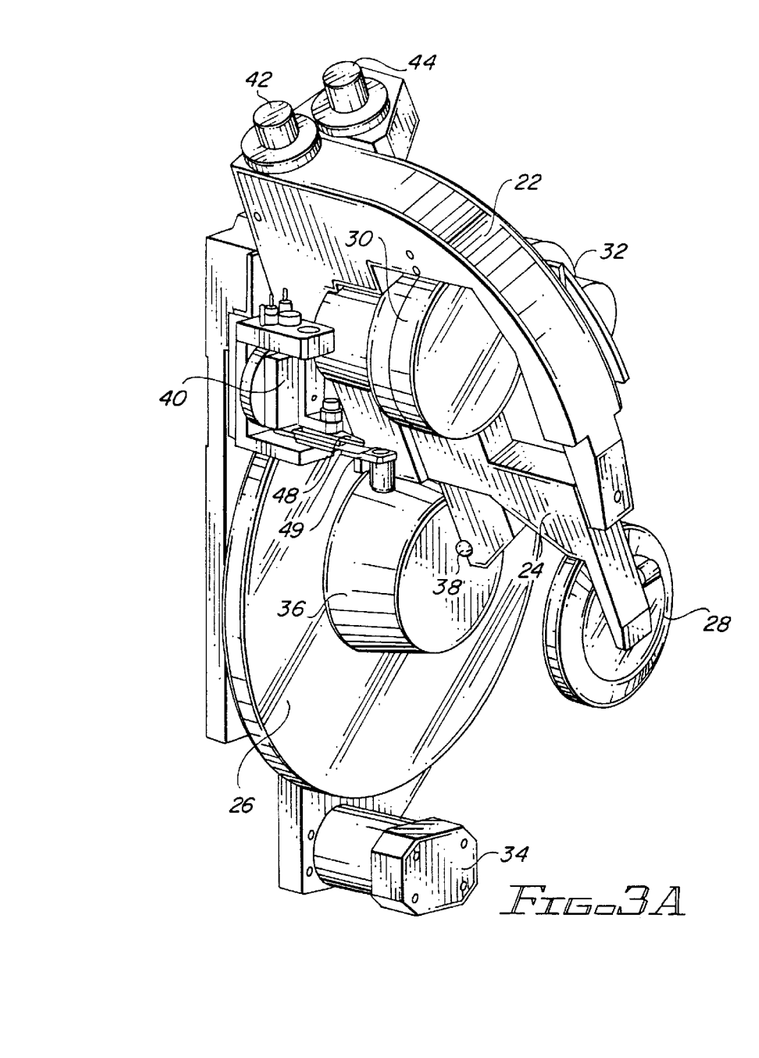
FIG. 3A is a perspective view of the preferred embodiment of the invention in the narrow field of view position.
Figure 3B:
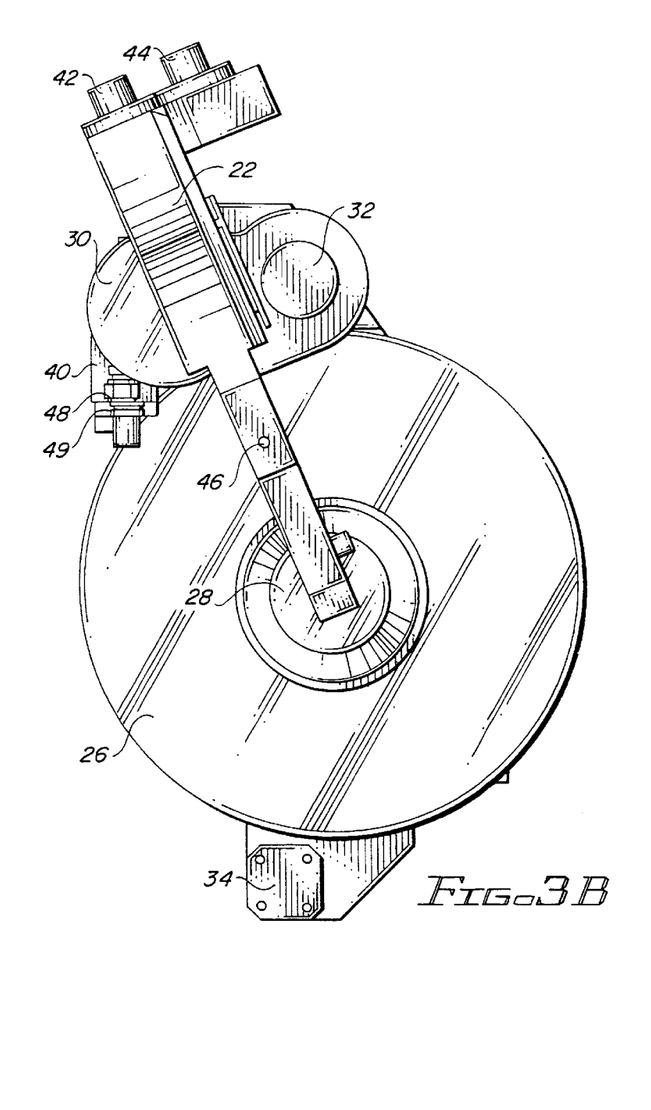
FIG. 3B is a head-on view of the arrangement of FIG. 3A.

The sequence of steps required to achieve the calibration position, in which the field of view optical groups 28, 30 and 32 are all removed from the optical axis, involves using the narrow field of view position of FIGS. 3A and 3B as the starting point. From this position, rotary assembly 24 is rotated clockwise while bi-stable motor 40 is commanded to insert hard stops 48 and 49 in its path and thereby arrest its movement at the calibration position shown in FIGS. 4A and 4B.

In addition to movable stops 48 and 49, the system is provided with other, stationary hard stops (such as the fixed hard stop 51) which are fixedly mounted on support member 22. These hard stops, like movable stop 48, operate to locate rotary assembly 24 precisely and repeatable at various operational positions of the system. In particular, the stationary hard stops comprise clockwise and counterclockwise stops and serve to position the medium field of view optical group 30 and the narrow field of view optical group (secondary mirror 28) in their respective operational positions, as shown in FIGS. 2A, 2B and 3A, 3B, respectively. The control computer keeps track of the state of the system and issues appropriate commands in order that any desired field of view or calibration position can be attained.

Figure 7:
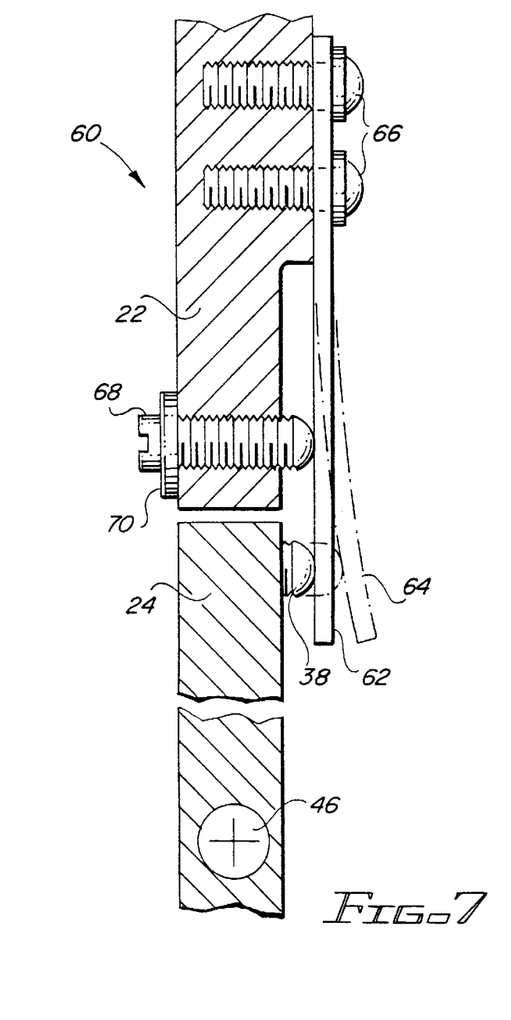
FIG. 7 is a schematic sectional view of the adjustable stop mechanism of the invention.

A notable feature of the invention is the stopping mechanism employed, which is designed to reduce the peak force of the impact of the moving components and to precisely and repeatably position the rotary assembly 24 in the desired operating positions. As seen in FIG. 7, hard stop 60 is comprised of a flexible spring member 62 which is anchored at one end to support member 22 by mounting screws 66. Upon impact with hard stop contact 38 provided on rotary assembly 24, spring 62 is deflected in the direction of motion to phantom position 64 to absorb the energy of the impact. This reduces stress and misalignment of the components. The spring 62 rebounds to its original position against the biasing screw 68 and thereby pushes the rotary assembly 24 to the desired position.

To maintain contact with the spring and hold the position of the rotary assembly 24, the materials of spring 62 and hard stop contact 38 are selected such that one can be magnetized and the other attracted thereto. In additions hard stop 60 is designed to be laterally adjustable to facilitate accurate alignment of the optical components. A biasing screw 68 is provided for this purpose, with rotation of the screw deflecting spring 62 and adjusting its position as desired, thereby locating the selected optical group precisely in the optical axis. Locknut 70 is provided to lock the position of screw 68 in place.

Bi-stable motor 40 actuates motion of movable stops 48 and 49 and exhibits another unique feature of the invention. Motor 40 is magnetically detented. Once powered to one of its two positions, it will hold that position until re-powered to the other position. It has a permanent magnet rotor and a fixed coil. If commanded to the engaged position by powering the fixed coil, the motor 40 will remain in that position when the power is removed. Similarly, if the motor 40 is powered by driving it to the disengaged position it will remain in the disengaged position when the power is removed. This is an important feature for providing system stability despite any motion or disturbance to which it may be subjected.

Figure 8:
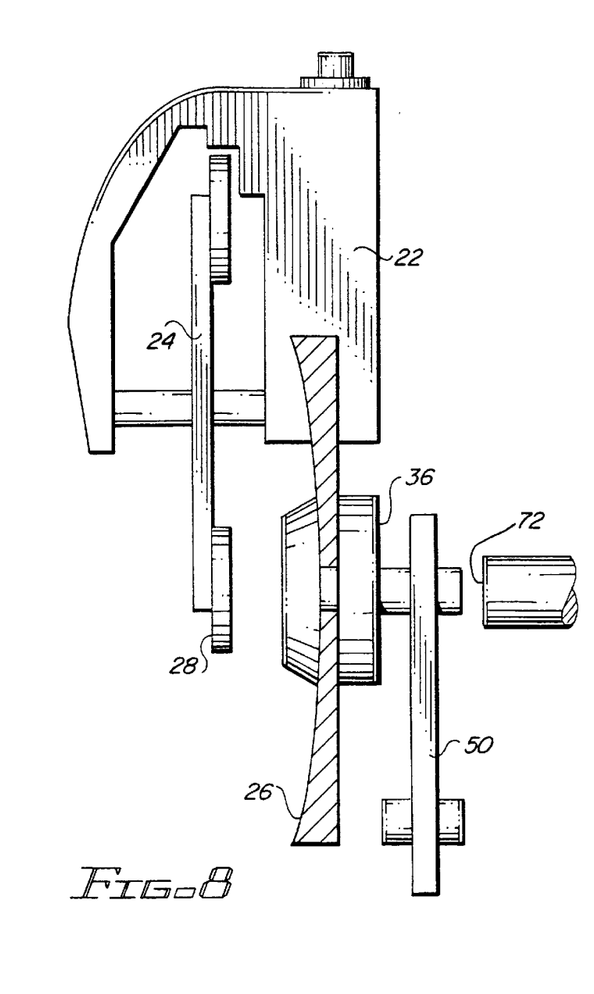
FIG. 8 is a diagrammatical view of the arrangement of FIGS. 1–6.

The design of the invention incorporates an extender optics component, which provides additional optical power modes intermediate to those of the three field of view modes discussed above. Extender optical groups such as 58 are mounted on rotary extender assembly 50 for insertion into the optical axis downstream of the rotary lens and mirror array 24, 28 and the primary mirror 26, as shown schematically in FIG. 8. These optical groups are selected to provide incremental power in the midway range between the three field of view modes. For example, if the wide field of view optical group 32 subtends an angle of 32° at the image plane 72, then insertion of the extender optical group 58 would reduce this angle by one-half to 16°. Similarly, an 8° medium field of view is reduced to 4°, and a 2° narrow field of view is reduced to 1°. Table I above summarizes these values.

Figure 5:
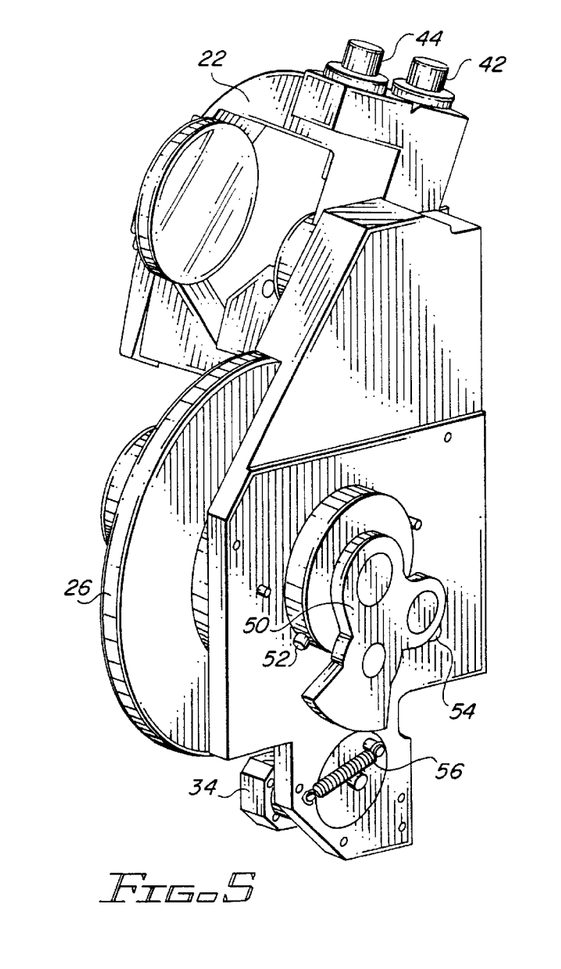
FIG. 5 is a perspective view of the preferred embodiment of the invention as seen from the back side, relative to the views of FIGS. 1A–4B, with the turret in the medium field of view position and with an optical extender assembly out of position.
Figure 6:
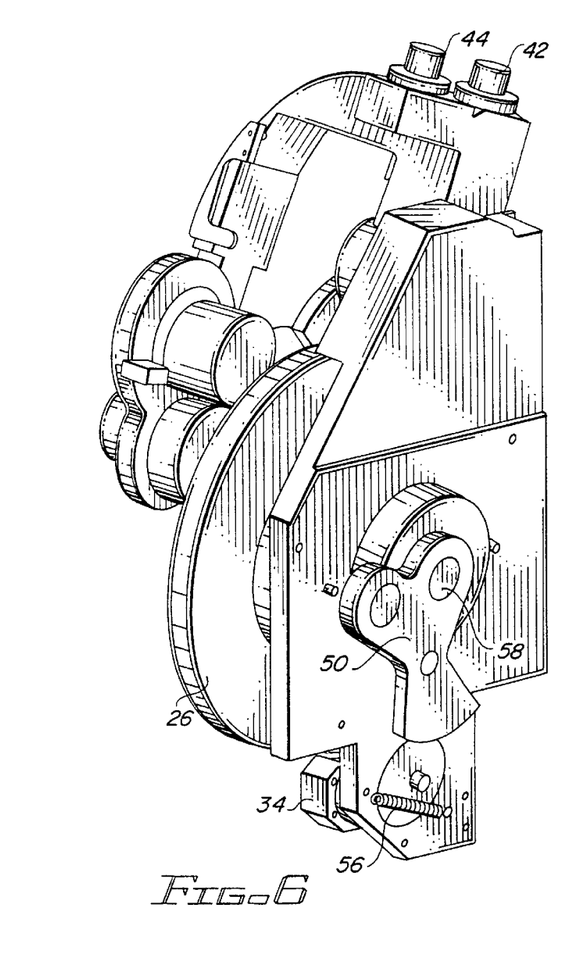
FIG. 6 is a perspective view corresponding to FIG. 5 with the turret in the wide field of view position and with the optical extender assembly in position.

FIGS. 5 and 6 depict in some detail a rotary extender assembly 50 on which is mounted extender optical group 58. The extender assembly 50 is rotatably mounted behind the primary mirror 26. Extender drive motor 34 is provided to actuate rotational movement of rotary extender assembly 50 to selectively insert optical group 58 in the optical axis. An overcenter latching spring 56 is provided for biasing the extender assembly 50 in position, while stationary stops 52 and 54 are provided to limit its rotational motion.

Motor 34 operates in response to command signals issued by a computer and works in conjunction with the front lens and mirror rotary assembly 24 to selectively achieve the desired field of view.

Although in the preferred six field of view embodiment of the invention only one extender optical group (58) is used, obviously the system could be adapted for use with more than one such optical group. Any number of movable stop schemes similar to that of the front lens and mirror rotary assembly 24 could be used to align such additional extender optical groups in the optical axis, including combinations of movable and stationary hard stops, or mechanically resettable latches. Also, optical band pass filters and other optical elements could be accommodated by a multi-position rotary extender assembly without departure from the spirit and scope of the invention.

An important feature of the invention is its versatility with respect to the optical prescriptions which it can employ. Field of view optical groups 28, 30 and 32 are housed in readily changeable lens barrels and can be replaced with different optical componentry to change the system parameters. Again, such modifications are contemplated by the invention and would not represent an inventive departure from the instant disclosure.

Although there have been described hereinabove various specific arrangements of a compact variable field of view optical system in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims What it is claimed is:

1. An optical telescope having a sequentially variable field of view comprising:

a primary mirror having a central aperture and an optical axis passing through said central aperture;

a focus lens group disposed along said optical axis;

a support member;

a rotary assembly rotatably mounted on said support member;

a rotary assembly drive means for rotating said rotary assembly;

a plurality of field of view optical groups mounted on said rotary assembly for sequential rotation into an operational position in said optical axis;

at least one hard stop contact disposed on said rotary assembly, said hard stop contact rotating in a prescribed path when said rotary assembly is rotated by said rotary assembly drive means;

at least one movable stop mounted for reciprocation between an engaged position in said prescribed path and a disengaged position clear of said prescribed path, said engaged position causing said movable stop to engage said hard stop contact to locate a first field of view optical group in said operational position;

a movable stop drive means for reciprocating said movable stop between said engaged and disengaged positions;

at least one stationary stop mounted on said support member, said stationary stop engaging said hard stop contact to locate a second optical field of view group in said operational position;

an extender assembly having at least one extender group mounted thereon, said extender assembly capable of translating said extender group into said optical axis;

an extender assembly drive means for translating said extender assembly; and a command signal source for issuing command signals to said rotary assembly drive means and said movable stop drive means to coordinate movements thereof.

2. The device of claim 1, wherein said command signal source issues command signals to said extender assembly drive means to control translation thereof.

3. The device of claim 1, wherein said optical telescope is adapted for use in the infrared wavelength range.

4. The device of claim 1, wherein said plurality of field of view optical groups comprises a wide optical group subtending a first field of view, a medium optical group subtending a second field of view, and a narrow optical group having a secondary mirror, said secondary mirror operating in conjunction with said primary mirror to subtend a third field of view.

5. The device of claim 4, wherein the width of said first field of view is in the range of 16–40 times the width of said third field of view, and the width of said second field of view is in the range of 4–6 times the width of said third field of view.

6. The device of claim 5, wherein said extender group is capable of providing an intermediate field of view for each field of view optical group and has an optical ratio in the range of 2:1 to 3:1.

7. The device of claim 1, wherein at least one optical filter is mounted on said extender assembly for translation into said optical axis.

8. The device of claim 1, wherein said stationary stop is adjustably mounted on said support member and is comprised of a resilient flexible member having a first end which is rigidly mounted to said support member and a second end which extends in a first direction into said prescribed path, said second end being movable in a second direction orthogonal to said first direction by a threaded mechanism having a locknut provided thereon, said second end adapted to impact said hard stop contact and to be resiliently deflected in the direction of rotation of said rotary assembly upon said impact.

9. The device of claim 8, wherein a magnet is provided to retain said hard stop contact against said stationary stop.

10. The device of claim 1, wherein said moving parts of the telescope are mass balanced to maintain a substantially constant center of gravity.

11. The device of claim 1, wherein said movable stop drive means comprises a bi-stable motor.

12. The device of claim 1, wherein a second movable stop is mounted for reciprocation between an engaged position in said prescribed path and a disengaged position clear of said prescribed path, said engaged position causing said second movable stop to locate said rotary assembly in a calibration position in which all of said field of view optical groups are clear of said operational position.

13. The device of claim 1, wherein a magnet is provided to retain said hard stop contact against said movable stop.

14. A switching device for switching optical groups in a system having an optical path comprising:
  a support member;
  a rotary assembly rotatably mounted on said support member;
  a rotary assembly drive means for rotating said rotary assembly;
  a plurality of switchable optical groups mounted on said rotary assembly for sequential rotation into an operational position in said optical path;
  at least one hard stop contact disposed on said rotary assembly, said hard stop contact rotating in a prescribed path when said rotary assembly is rotated by said rotary assembly drive means;
  at least one movable stop mounted for reciprocation between an engaged position in said prescribed path and a disengaged position clear of said prescribed path, said engaged position causing said movable stop to locate a first switchable optical group in said operational position;
  a movable stop drive means for reciprocating said movable stop between said engaged and disengaged positions;
  at least one stationary stop mounted on said support member, said stationary stop engaging said hard stop contact to locate a second switchable optical group in said operational position; and
  a command signal source for issuing command signals to said rotary assembly drive means and said movable stop drive means to coordinate movements thereof.

15. The device of claim 14, wherein said stationary stop is adjustably mounted on said support member and comprises a resilient flexible member having a first end which is rigidly mounted to said support member and a second end which extends in a first direction into said prescribed path, said second end being movable in a second direction orthogonal to said first direction by a threaded mechanism having a locknut provided thereon, said second end adapted to impact said hard stop contact and to be deflected in the direction of rotation of said rotary assembly upon said impact.

16. The device of claim 15, wherein a magnet is provided to retain said hard stop contact against said stationary stop.

17. The device of claim 14, wherein said switchable optical groups vary the field of view of said optical system.

18. The device of claim 14, wherein one of said switchable optical groups comprises a secondary mirror of a Cassegrain telescope and another of said switchable optical groups comprises a refractive element.

19. The device of claim 14, wherein said movable stop drive means comprises a bi-stable motor.

20. The device of claim 14, wherein a second movable stop is mounted for reciprocation between an engaged position in said prescribed path and a disengaged position clear of said prescribed path, said engaged position causing said second movable stop to locate said rotary assembly in a calibration position in which all of said switchable optical groups are clear of said operational position.

21. The device of claim 14, wherein a magnet is provided to retain said hard stop contact against said movable stop.

22. A method for switching optical groups in an optical system having a plurality of switchable optical groups comprising:
  mounting said switchable optical groups on a rotary assembly, said rotary assembly being rotatably mounted on a support member and provided with at least one hard stop contact which rotates in a prescribed path when said rotary assembly rotates;
  sequentially rotating said switchable optical groups into an operational position disposed in the optical path of said system;
  inserting at least one movable stop into said prescribed path for engagement with said hard stop contact to locate a first switchable optical group in said operational position;
  providing at least one stationary stop for engagement with said hard stop contact to locate a second switchable optical group in said operational position; and
  issuing command signals to coordinate movement of said rotary assembly and said movable stop, said movement being effected by drive means responsive to said command signals.

23. The method of claim 22, wherein said stationary stop comprises a resilient flexible member having a first end which is rigidly mounted to a support member and a second end which extends in a first direction into said prescribed path, said second end being movable in a second direction orthogonal to said first direction by a threaded mechanism having a locknut provided thereon, said second end adapted to impact said hard stop contact and to be deflected in the direction of rotation of said rotary assembly upon said impact.

24. The method of claim 23, wherein a magnet is provided to retain said hard stop contact against said stationary stop.

25. The method of claim 22, wherein said switchable optical groups vary the field of view of said optical system.

26. The method of claim 22, wherein one of said switchable optical groups comprises a secondary mirror of a Cassegrain telescope and another of said switchable optical groups comprises a refractive element.

27. The method of claim 22, wherein said drive means comprises a bi-stable motor.

28. The method of claim 22, wherein a second movable stop is provided for reciprocation between an engaged position in said prescribed path and a disengaged position clear of said prescribed path, said engaged position causing said second movable stop to locate said rotary assembly in a calibration position in which all of said switchable optical groups are clear of said operational position.

29. The method of claim 22, wherein a magnet is provided to retain said hard stop contact against said movable stop.

30. A method of sequentially varying the field of view of an optical system comprising:

rotating one of at least three field of view optical groups into an operational position in an optical axis of said system, each said field of view optical group operating to subtend a field of view having a prescribed width;

providing at least one extender optical group for translation between an extension position in said optical axis and a non-extension position outside said optical axis, said extender optical group reducing said prescribed width to an intermediate value when disposed in said extension position.

31. The method of claim 30, wherein said optical groups are mounted on a rotary assembly rotatably mounted on a support means, said rotary assembly having at least one hard stop contact disposed thereon.

32. The method of claim 31, wherein a rotary assembly drive means is provided for rotating said rotary assembly, said hard stop contact rotating in a prescribed path when said rotary assembly is rotated, said prescribed path having at least one stationary stop disposed therein for engaging said hard stop contact to thereby locate a first field of view optical group in said operational position.

33. The method of claim 32, wherein at least one movable stop is provided for reciprocation by a movable stop drive means between an engaged position in said prescribed path and a disengaged position clear of said prescribed path, said engaged position causing said movable stop to engage said hard stop contact to thereby locate a second field of view optical group in said operational position.

34. The method of claim 33, wherein said movable stop drive means reciprocates a second movable stop between an engaged position and a disengaged position, said engaged position causing said second movable stop to engage a second hard contact disposed on said rotary assembly to thereby locate all said field of view optical groups in a calibration position clear of said operational position.

35. The method of claim 34, wherein said movable stop drive means is a bi-stable motor.

36. The method of claim 33, wherein a command signal source is provided for issuing command signals to said rotary assembly drive means and said movable stop drive means.

37. The method of claim 36, wherein said command signal source issues command signals to an extender assembly drive means for controlling movement of said extender assembly.

* * * * *